Patented Sept. 7, 1943

2,328,726

UNITED STATES PATENT OFFICE 2,328,726

INSECTICIDE

Frederick B. La Forge, Clarendon, Va., and Herbert L. J. Haller, Washington, D. C., assignors to Claude R. Wickard, as Secretary of Agriculture of the United States of America No Drawing. Application November 15, 1941, Serial No. 419,327

2 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to improvements in materials for destroying or checking the growth or multiplication of living organisms, whether plant or animal, which are economically injurious to men.

The principal object of our invention is to provide a material suitable for use as an insecticide.

A further object is to provide such a product which can be used as a powder or in solution as a spray or otherwise for plants, trees or animals, or as a concentrated extract.

Our invention consists of a product obtained from a plant known as prickly ash, sometimes called toothache tree, pepperwood, hercules' club, and prickly yellow wood. Botanists know it as Zanthoxylum clava-herculis L. It ranges from southern Virgina to Florida and Texas in the United States. The product may be obtained from the bark, root, fruit or leaves of the plant.

A method of securing the product may be as follows: A hydrocarbon solution of prickly ash bark, prepared by extracting the finely ground bark with petroleum ether is treated with 90 percent aqueous acetic acid. The acetic acid part is concentrated to a small volume, preferably under reduced pressure and the concentrate is dissolved in ethyl ether. The ethereal solution is washed with water and then dried with sodium sulfate. The ether is removed and the remaining concentrate is extracted with hot ligroin. On removal of the solvent there remains a light colored semi-solid which in its action on flies is similar to pyrethrum.

The product so obtained may be dissolved in a suitable solvent or emulsified with a suitable agent or adsorbed on a suitable powder or dust, such as, for example, clay, talc, bentonite, etc. The concentrate may also be employed in admixture with pyrethrum, derris, nicotine, arsenicals and other insecticides. It is not necessary to carry through all of the stages of the procedure given above and if desired the root, bark, leaves or fruit may be used in the form of a dust, with or without diluents. The proportions of the product may be varied as desired for different purposes.

Having thus described our invention, what we claim for Letters Patent is:

1. An insecticide containing as its essential active ingredient an extract of prickly ash, Zanthoxylum clava-herculis L.

2. An insecticide comprising prickly ash and a carrying agent.

FREDERICK B. LA FORGE.
HERBERT L. J. HALLER.